US009244550B2

(12) United States Patent
Singh et al.

(10) Patent No.: US 9,244,550 B2
(45) Date of Patent: Jan. 26, 2016

(54) ELECTRONIC DEVICE AND METHOD OF IDENTIFYING FREQUENCY FOR DETECTING TOUCHES

(71) Applicant: BLACKBERRY LIMITED, Waterloo (CA)

(72) Inventors: Amit Pal Singh, Waterloo (CA); Premal Vinodchandra Parekh, Waterloo (CA); Rohan Michael Nandakumar, Kitchener (CA); Byron Allen Schiel, Coral Springs, FL (US); John Edward Dolson, Carp (CA)

(73) Assignee: BlackBerry Limited, Waterloo (CA)

( * ) Notice: Subject to any disclaimer, the term of this patent is extended or adjusted under 35 U.S.C. 154(b) by 222 days.

(21) Appl. No.: 13/969,089

(22) Filed: Aug. 16, 2013

(65) Prior Publication Data
US 2015/0049027 A1 Feb. 19, 2015

(51) Int. Cl.
G06F 3/041 (2006.01)
G06F 3/044 (2006.01)

(52) U.S. Cl.
CPC .............. G06F 3/041 (2013.01); G06F 3/044 (2013.01); G06F 3/0418 (2013.01)

(58) Field of Classification Search
None
See application file for complete search history.

(56) References Cited

U.S. PATENT DOCUMENTS

| 7,986,193 | B2 | 7/2011 | Krah |
| 8,054,090 | B2 | 11/2011 | Philipp et al. |
| 8,294,687 | B1 | 10/2012 | Ksondzyk |
| 2011/0063993 | A1 | 3/2011 | Wilson et al. |
| 2012/0217978 | A1 | 8/2012 | Shen et al. |
| 2012/0268415 | A1 | 10/2012 | Konovalov et al. |
| 2013/0176272 | A1 | 7/2013 | Cattivelli et al. |
| 2014/0267059 | A1* | 9/2014 | Deokar et al. ............... 345/173 |

OTHER PUBLICATIONS

Extended European Search Report: dated Feb. 9, 2015, issued in respect of corresponding European Patent Application No. 14181196.
Printout of "Atmel's Next-Generation maXTouch S Series Touchscreen Controllers Enable a New Class of Mobile Products" retrieved from http://ir.atmel.com/releasedetail.cfm?ReleaseID=637804 Jan. 9, 2012.
John Carey, "Noise Wars: Projected Capacitance Strikes Back", Investigating Display and Charger Noise: Projected Capacitance Evolving Cypress Semiconductor Corp., Sep. 2011.

* cited by examiner

Primary Examiner — Nicholas Lee
(74) Attorney, Agent, or Firm — Geoffrey deKleine; Borden Ladner Gervais LLP

(57) ABSTRACT

A method includes identifying a first plurality of drive frequencies at which drive electrodes of a touch-sensitive display of an electronic device are driven, wherein the first plurality of drive frequencies includes a first frequency and a second frequency. A first noise value at the first frequency is determined. When the first noise value meets a first threshold value and the first noise value is less than a second threshold value that is greater than the first threshold value, a second noise value at the second frequency is determined by the electronic device and, in response to determining that the second noise value is less than the first threshold value, driving the drive electrodes at the second frequency. When the first noise value meets the second threshold value, a third frequency at which the drive electrodes are driven is identified by the electronic device, wherein the third frequency is not one of the first plurality of drive frequencies.

17 Claims, 4 Drawing Sheets

ELECTRONIC DEVICE AND METHOD OF IDENTIFYING FREQUENCY FOR DETECTING TOUCHES

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
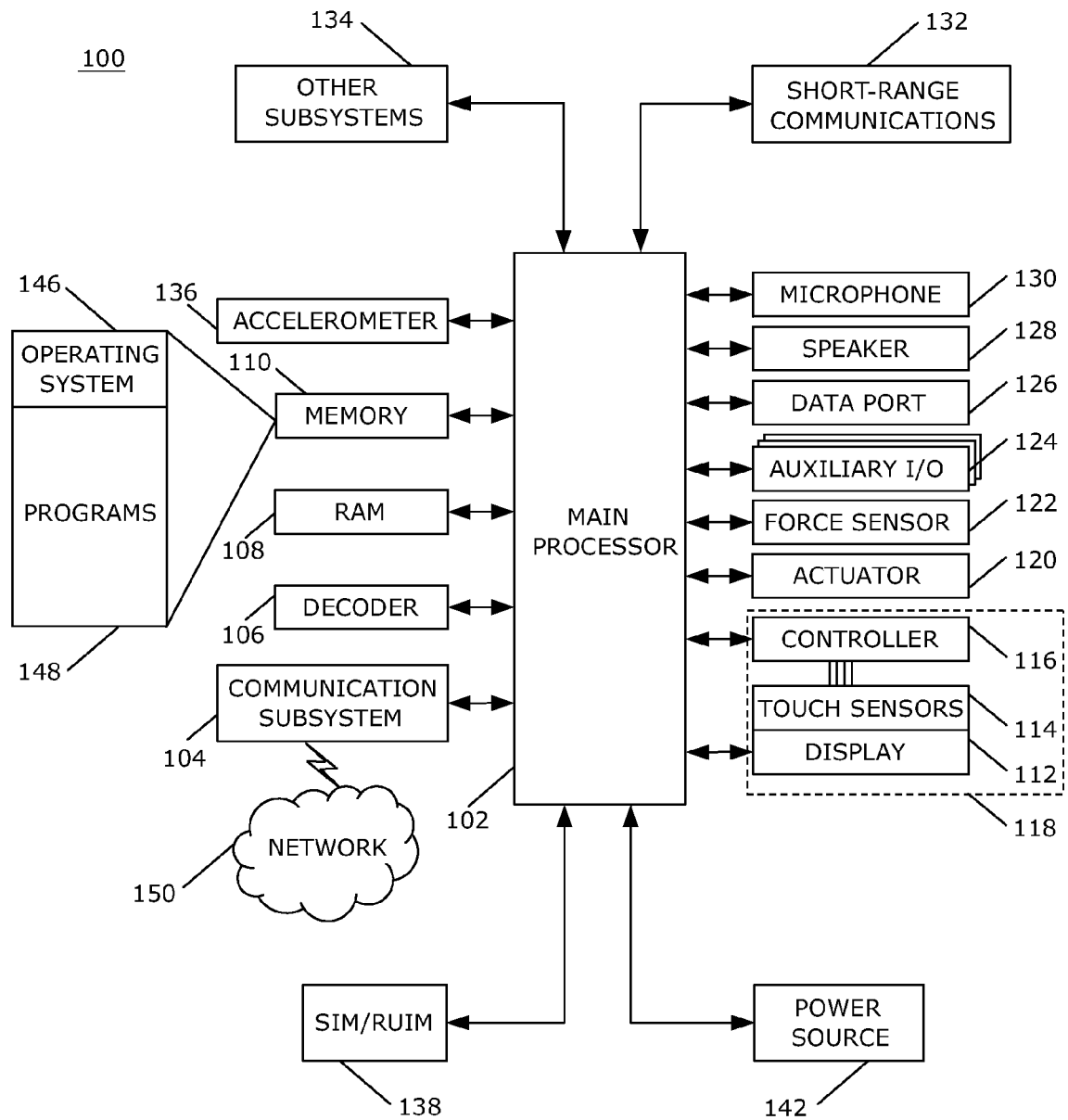
FIG. 1 is a block diagram of a portable electronic device in accordance with the disclosure.

The following describes an apparatus for and method of selecting a frequency at which to drive electrodes of a touch-sensitive display. The method includes identifying frequencies, including a first frequency and a second frequency, at which the drive electrodes of a touch-sensitive display are driven. A first noise value at the first frequency is determined. When the first noise value meets a first threshold value, and the first noise value is less than a second threshold value that is greater than the first threshold value, a second noise value at the second signal frequency is determined. The drive electrodes are driven at the second frequency in response to determining that the second noise value is less than the first threshold value. When the first noise value meets the second threshold value, a new frequency at which the drive electrodes are driven is determined.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without Wi-Fi communication capabilities, such as handheld electronic games, digital photograph albums, digital cameras, media players, e-book readers, and so forth. Examples of non-portable electronic devices include desktop computers, electronic white boards, smart boards utilized for collaboration, built-in monitors or displays in furniture or appliances, and so forth.

A block diagram of an example of an electronic device 100 is shown in FIG. 1. The electronic device 100 includes multiple components, such as a processor 102, e.g., a microprocessor or discrete control circuitry that controls the overall operation of the electronic device 100, which processor 102 is a hardware device or apparatus that may include memory. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Short-range communications include, for example, Bluetooth communications, near-field communications (NFC), and other short or limited range communications. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be a capacitive touch-sensitive display that includes capacitive touch sensors 114. The capacitive touch sensors 114 may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
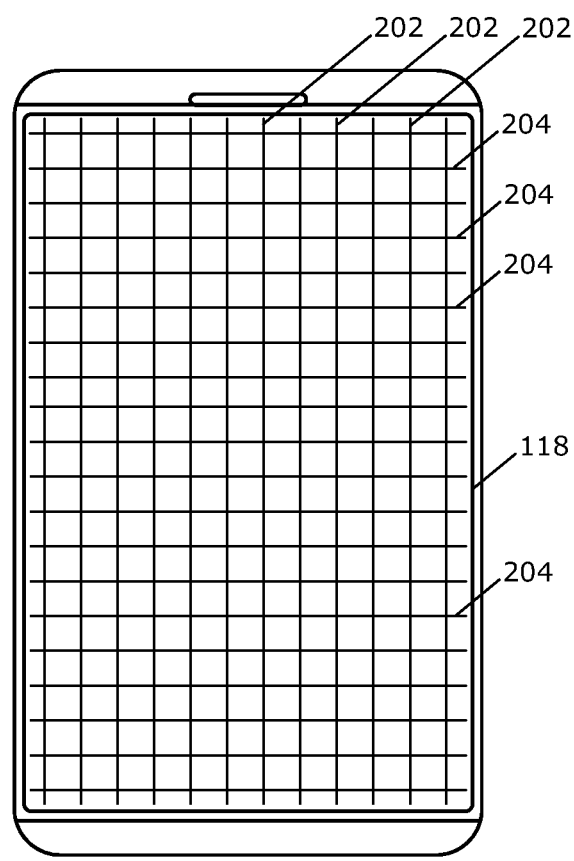
FIG. 2 is a front view of an electronic device in accordance with the disclosure.

A front view of an electronic device 100 is shown in FIG. 2. The touch-sensitive display 118 includes touch sensors 114, also referred to as touch-sensing electrodes. The touch-sensors 114 are operably coupled to the controller 116.

The touch sensors 114 include drive electrodes 202 and sense electrodes 204 that may be disposed on two layers of the touch-sensitive display 118 such that the drive electrodes 202 are disposed on one layer and the sense electrodes 204 are disposed on another layer. Alternatively, the drive electrodes 202 and the sense electrodes 204 may be disposed generally on one layer or plane of the touch-sensitive display 118. The drive electrodes 202 and the sense electrodes 204 are not visible when viewing the electronic device 100 without utilizing an optical instrument, such as a microscope, loupe, or magnifying glass, but are shown as visible in FIG. 2 for the purpose of illustration. In the example of FIG. 2, the drive electrodes 202 are the longer or vertical electrodes, and the sense electrodes 204 are the shorter or horizontal electrodes. Alternatively, the drive electrodes may be the shorter or horizontal electrodes, and the sense electrodes may be the longer or vertical electrodes. The sense electrodes 204 are utilized to detect changes in sense signals at the nodes 206, which are the locations where the sense electrodes 204 cross over or under the drive electrodes 202.

The drive electrodes 202 are driven by drive signals from the controller 116, and sense signals are received, by the controller 116, from the sense electrodes 204, i.e., the sense electrodes 204 send sense signals to the controller 116. Data from the sense signals is utilized, for example, to detect touches and determine touch locations. The drive electrodes 202 are driven at a frequency, referred to as a drive frequency. A drive signal is applied to the drive electrodes, which drive signal is applied at the drive frequency. Noise, such as electrical noise caused by coupling with an external power source, noise generated by the electronic device 100, noise from the environment in which the electronic device 100 is operated, and so forth, may affect the sense signals received from the sense electrodes 204. When noise is present at the drive frequency, the sense signals are affected by the noise, resulting in inaccurate touch data that may result in incorrect touch location, false detection of touches, missed detection of touches, and so forth.

Figure 3:
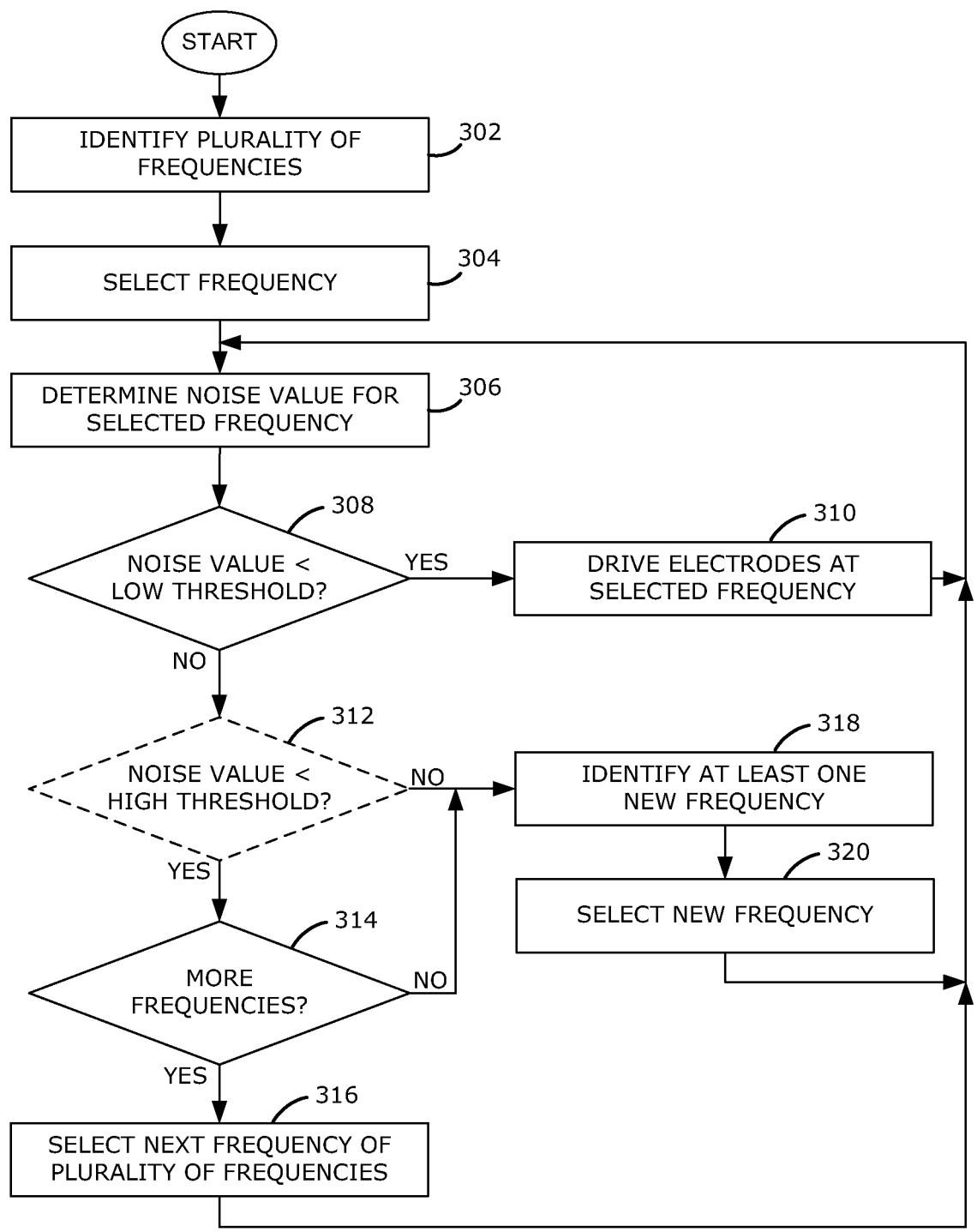
FIG. 3 is a flowchart illustrating a method of identifying a frequency at which drive electrodes of a touch-sensitive display are driven in accordance with the disclosure.

A flowchart illustrating an example of a method of selecting or identifying a drive frequency for the drive electrodes of a touch-sensitive display 118 of an electronic device is illustrated in FIG. 3. The method may be carried out by the electronic device 100, e.g., by software executed, for example, by the controller 116 or the processor 102 of the electronic device 100. Coding of software for carrying out such a method is within the scope of a person of ordinary skill in the art given the present description. The method may contain additional or fewer processes than shown and/or described, and may be performed in a different order. Computer-readable code executable by at least one controller 116 or processor 102 of the electronic device 100 to perform the method may be stored in a computer-readable storage medium, device, or apparatus, which may be a non-transitory or tangible storage medium, device, or apparatus.

The process of FIG. 3 may be performed at any suitable time. For example, the process may be performed in response to detecting that the electronic device 100 is coupled, either directly or indirectly, to an external power source. An external power source may include, for example, coupling to an AC power source to charge a battery of the electronic device 100, coupling to a monitor or external display that is connected to an AC power source, coupling to an audio input or output device that is connected to an AC power source, and so forth. The coupling to the external power source may be detected when a power source is connected to a port of the electronic device 100, for example, when a Universal Serial Bus (USB) handshake occurs between the portable electronic device and the external power source. Alternatively, a characteristic or voltage value may be detected or determined, which suggests that the external power source is coupled. Other methods of detecting the external power source may be utilized. The processor 102 may send a notification to the controller 116 to perform the method of the example of FIG. 3. Noise detection hardware or software may also trigger performing the method.

A plurality of frequencies for driving the drive electrodes 202 are identified 302. The frequencies include any suitable number of different frequencies. For example, five frequencies may be identified at 302. The frequencies may be, for example, default frequencies, factory identified frequencies, previously identified frequencies, and so forth. An identification of the plurality of frequencies may be stored in a list or table in the controller 116 or in memory accessible by the controller 116 or in the processor 102.

One frequency of the plurality of drive frequencies is selected 304 by the electronic device. The selected drive frequency may be the first frequency identified in the list or table, a lowest frequency of the plurality of drive frequencies, a highest frequency of the plurality of drive frequencies, a frequency with the lowest detected noise when the frequencies were chosen, or may be a frequency selected based on any other suitable criteria.

A noise value for the selected drive frequency is determined 306. The noise value is determined from sense signals received from the sense electrodes 204 during a period of time while the drive electrodes 202 are not driven. A value or magnitude of the received signals is determined. To determine the value or magnitude, the sense signals may be received from the sense electrodes 204 during one period of time or during multiple periods of time. The value or values or the sense signals received over one or more periods of time may be averaged. Alternatively, a maximum value of the sense signals may be identified, and the value or magnitude of the received signals may be the maximum or peak noise detected by the sense electrodes. The value of the received sense signals is representative of the magnitude of noise at the selected drive frequency.

When the noise value at the selected drive frequency is less than a low threshold noise value at 308, the drive electrodes 202 are driven 310 at the selected drive frequency to detect touches on the touch-sensitive display 118. The low noise threshold may be, for example, a default value, a factory setting, or a calculated noise value. The low noise threshold is utilized to determine when the noise value is sufficiently low that a touch location may be determined within an acceptable accuracy range, such as a minimum signal-to-noise ratio. The electrodes 202 may be driven at the selected drive frequency during a single scan of the touch-sensitive display or during a plurality of scans of the touch-sensitive display 118, and the process continues at 306. The noise value at the selected drive frequency may be determined for each scan of the touch-sensitive display 118, may be determined after a plurality of scans, may be determined for a plurality of scans, and so forth.

When the noise value meets the low noise threshold at 308, and, optionally, the noise value is less than a high noise threshold at 312, a determination is made 314 whether any of the plurality of identified frequencies has not been processed to determine a noise value. The high noise threshold is greater than the low noise threshold or has a higher magnitude than the low noise threshold. A value meets a threshold when the value is equal to or greater than the threshold. When a frequency of the plurality of identified frequencies has not been processed to determine a noise value, that frequency is selected 316, and the process continues at 306. Generally, when the noise meets the low threshold but not the high threshold for all identified frequencies, the identified frequencies are not utilized for touch detection and at least one new frequency is identified at 318. When all of the plurality of identified drive frequencies have been processed at 314, the process continues at 318.

Figure 4:
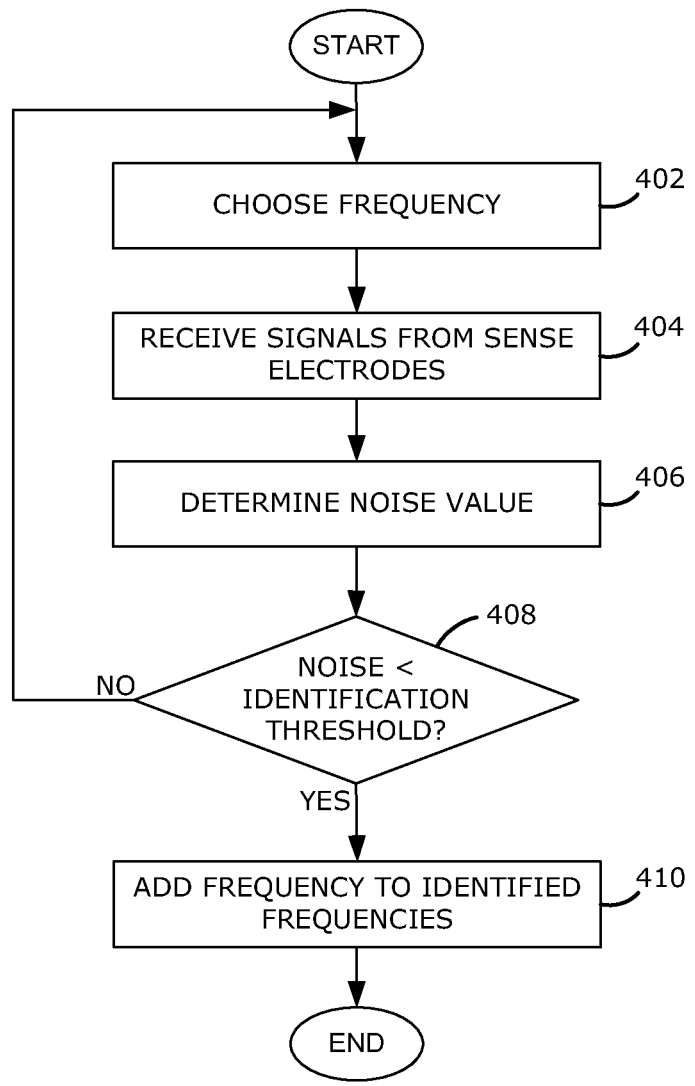
FIG. 4 is a flowchart illustrating a method of identifying a new frequency at which drive electrodes of a touch-sensitive display are driven in accordance with the disclosure.

Optionally, when the noise value meets the high threshold 312, at least one new frequency is identified 318. One example of how to identify a new frequency is shown in the flowchart of FIG. 4. The new frequency is not one of the plurality of frequencies identified at 302. The high threshold value may be utilized to determine when the noise value is sufficiently high that one or more of the previously identified frequencies is not sufficiently reliable for accurate touch location determination. For example, the previously identified frequencies may not be reliable when a change in environment or coupling to an external power source occurs. The newly identified frequency, or one of a plurality of newly identified frequencies, is selected at 320, and the process continues at 306.

A flowchart illustrating an example of method of identifying a new drive frequency at which to drive electrodes of the touch-sensitive display 118 is illustrated in FIG. 4. The method may be carried out by software executed, for example, by the controller 116 or the processor 102. Coding of software for carrying out such a method is within the scope of a person of ordinary skill in the art given the present description. The method may contain additional or fewer processes than shown and/or described, and may be performed in a different order. Computer-readable code executable by at least one controller 116 or processor 102 of the electronic device 100 to perform the method may be stored in a computer-readable storage medium, device, or apparatus, which may be a non-transitory or tangible storage medium, device, or apparatus.

A frequency is chosen or identified 402 by the controller 116 or the processor 102, for example, by selecting a frequency that is not one of the previously identified 302 frequencies. The frequency may be chosen or identified randomly, within a suitable frequency range for driving the drive electrodes, or by incrementing or decrementing a previously identified frequency by a set value. One or more factors may be taken into account when identifying or selecting a suitable frequency range. For example, the scan rate or time to scan the touch-sensitive display in order to detect touches is at least partly related to the drive frequency. Alternatively, or in addition, the frequency range may be outside the frequency or frequency range of the expected or typical noise caused by the portable electronic device 100 being coupled to an external power source. The frequency range may also take into consideration the electrical resistance of the drive electrodes, which is related to the material properties, the size, and the pattern or construction of the drive electrodes.

Sense signals are received 404 from the sense electrodes 204 for a period of time at the chosen frequency. The drive electrodes 202 are not driven while the sense signals are received 404 from the sense electrodes 204, i.e., the sense electrodes 204 send the sense signals to the controller 116 while the drive electrodes 202 are not driven.

A noise value for the chosen frequency is determined 406 by determining a value or magnitude of the received sense signals, as described above.

When the noise value at the chosen frequency is less than an identification threshold 408, the chosen frequency is identified as a new frequency for driving the drive electrodes 202. The identification threshold may be any suitable threshold, below which the noise value is sufficiently low that touch locations may be reliably determined within an acceptable accuracy range. The identification threshold may be any suitable value. For example, the identification threshold may be equal to the low threshold. Alternatively, the identification threshold may be less than the low threshold.

When the chosen frequency is identified as a new frequency, the chosen frequency may be added 410 to the plurality of frequencies, for example, by adding an identification of the chosen frequency to the list or table of the plurality of drive frequencies. The frequency that is added is not one of the plurality of previously identified frequencies. The frequency may be added to the plurality of drive frequencies or by replacing a previously identified frequency. Alternatively, all previously identified frequencies may be removed or deleted, and a plurality of new drive frequencies may be created by choosing a plurality of new drive frequencies as described above. The touch-sensitive display 118 may be scanned to detect touches after adding a new frequency such that the touch-sensitive display 118 is scanned to detect touches between adding new frequencies. Alternatively, the new frequencies may be added without scanning the touch-sensitive display 118 to detect touches.

Previous electronic devices typically identify three to five drive frequencies that are fixed or unchangeable once the device is manufactured. When such an electronic device experiences unacceptable noise levels at each of these drive frequencies, the only option may be to identify which drive frequency has the lowest noise level, even when that lowest noise level is unacceptable. The above describes how one or more new drive frequencies may be identified to replace or augment noisy drive frequencies.

Accurate touch data is facilitated when the noise value is low during touch detection. The identification of new drive frequencies is performed when the previously identified frequencies are determined to be unreliable, for example, due to high noise levels. New frequencies need not be identified after each scan of the touch-sensitive display 118, reducing the time and power requirements for identifying new drive frequencies.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   identifying a first plurality of drive frequencies at which drive electrodes of a touch-sensitive display of an electronic device are driven, wherein the first plurality of drive frequencies includes a first frequency and a second frequency;
   determining a first noise value at the first frequency;
   in response to determining that the first noise value meets a first threshold value, comparing the first noise value to a second threshold that is greater than the first threshold value; and
   in response to determining that the first noise value is less than the second threshold value that is greater than the first threshold value:
     determining, by the electronic device, a second noise value at the second frequency and
     driving the drive electrodes at the second frequency in response to determining that the second noise value is less than the first threshold value;
   in response to determining that the first noise value meets the second threshold value, identifying, by the electronic device, a third frequency at which the drive electrodes are driven, wherein the third frequency is not one of the first plurality of drive frequencies by:
     receiving, from sense electrodes of the touch-sensitive display, a sense signal at the third frequency while the drive electrodes are not driven;

determining a third noise value for the third frequency; and determining whether the third noise value is less than an identification threshold.

2. The method according to claim 1, comprising adding the third frequency to the first plurality of frequencies.

3. The method according to claim 1, comprising adding the third frequency to a second plurality of frequencies, wherein the second plurality of frequencies does not include the first frequency and the second frequency.

4. The method according to claim 1, comprising, when the first noise value meets the second threshold value, identifying a fourth frequency at which the drive electrodes are driven, wherein the fourth frequency is not one of the plurality of frequencies.

5. The method according to claim 1, comprising, when the second noise value meets the first threshold value and is less than the second threshold value:
   determining a noise value at a fourth frequency of the first plurality of drive frequencies and
   utilizing the fourth frequency to drive the drive electrodes in response to determining that the noise value at the fourth frequency is less than the first threshold value.

6. The method according to claim 1, wherein identifying the first plurality of signal frequencies comprises:
   selecting the first frequency;
   receiving, from sense electrodes of the touch-sensitive display, a first sense signal at the first frequency while the drive electrodes are not driven;
   determining the first noise value for the first sense signal;
   determining that the first noise value is less than an identification threshold; and
   adding the first frequency to the first plurality of frequencies.

7. The method according to claim 1, comprising, when the first noise value is less than the first threshold value, driving the drive electrodes at the first frequency.

8. The method according to claim 1, wherein determining the first noise value comprises determining the first noise value while the drive electrodes are not driven.

9. The method according to claim 1, wherein determining the first noise value at the first frequency is performed in response to determining that the electronic device is coupled to an external power source.

10. A non-transitory computer-readable storage device having computer-readable code executable by at least one processor of the portable electronic device to perform the method of claim 1.

11. An electronic device comprising:
   a touch-sensitive input device comprising a plurality of drive electrodes and a plurality of sense electrodes;
   a controller coupled to the plurality of drive electrodes and the plurality of sense electrodes and configured to:
      identify a first plurality of frequencies at which the drive electrodes are driven, wherein the first plurality of frequencies include a first frequency and a second frequency;
      determine a first noise value at the first frequency;
      in response to determining that the first noise value meets a first threshold value, comparing the first noise value to a second threshold that is greater than the first threshold value; and
      in response to determining that the first noise value is less than second threshold value that is greater than the first threshold value:
         determine a second noise value at the second drive frequency and
         drive the drive the drive electrodes at the second frequency in response to determining that the second noise value is less than the first threshold value;
      in response to determining that the first noise value meets the second threshold value, identify a third frequency at which the drive electrodes are driven, wherein the third frequency is not one of the plurality of frequencies, by:
         receiving, from sense electrodes of the touch-sensitive display, a sense signal at the third frequency while the drive electrodes are not driven;
         determining a third noise value for the third frequency; and
         determining whether the third noise value is less than an identification threshold.

12. The electronic device according to claim 11, wherein the third frequency is added to the first plurality of frequencies.

13. The electronic device according to claim 11, wherein the third frequency is added to a second plurality of frequencies, wherein the second plurality of frequencies does not include the first frequency and the second frequency.

14. The electronic device according to claim 11, wherein, when the first noise value meets the second threshold value, a fourth frequency at which the drive electrodes are driven is identified, wherein the fourth frequency is not one of the plurality of frequencies.

15. The electronic device according to claim 11, wherein, when the second noise value meets the first threshold value and is less than the second threshold value, a noise value at an other frequency of the first plurality of drive frequencies is identified and is utilized to drive the drive electrodes.

16. The electronic device according to claim 11, wherein determining the first noise value comprises determining the first noise value while the drive electrodes are not driven.

17. The electronic device according to claim 11, comprising a processor configured to send a notification to a controller of the touch-sensitive display when the electronic device is coupled to an external power source, and wherein the controller is configured to detect the first noise value in response to receipt of the notification.

* * * * *